US011733967B2

(12) United States Patent
Morgan

(10) Patent No.: US 11,733,967 B2
(45) Date of Patent: *Aug. 22, 2023

(54) SPLIT AND DUPLICATE RIPPLE CIRCUITS

(71) Applicant: Micron Technology, Inc., Boise, ID (US)

(72) Inventor: Donald Martin Morgan, Meridian, ID (US)

(73) Assignee: Micron Technoloay Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/873,862

(22) Filed: Jul. 26, 2022

(65) Prior Publication Data
US 2023/0028060 A1 Jan. 26, 2023

Related U.S. Application Data

(63) Continuation of application No. 16/908,423, filed on Jun. 22, 2020, now Pat. No. 11,416,217.

(51) Int. Cl.
*G06F 7/02* (2006.01)
*G06F 7/507* (2006.01)
(Continued)

(52) U.S. Cl.
CPC ............... *G06F 7/501* (2013.01); *G06F 7/02* (2013.01); *G06F 7/026* (2013.01); *G06F 7/503* (2013.01); *G06F 7/507* (2013.01)

(58) Field of Classification Search
CPC .................................. G06F 7/02; G06F 7/026
(Continued)

(56) References Cited

U.S. PATENT DOCUMENTS 5,636,157 A 6/1997 Hesson et al.
8,234,320 B1 7/2012 Yeo
(Continued)

FOREIGN PATENT DOCUMENTS

CN 108228419 A 6/2018

OTHER PUBLICATIONS

K. K. Gunnam, G. S. Choi and M. B. Yeary, "A Parallel VLSI Architecture for Layered Decoding for Array LDPC Codes," 20th International Conference on VLSI Design held jointly with 6th International Conference on Embedded Systems (VLSID'07), Bangalore, India, 2007, pp. 738-743 (Year: 2007).*

(Continued)

*Primary Examiner* — Matthew D Sandifer
(74) *Attorney, Agent, or Firm* — Holland & Hart LLP

(57) ABSTRACT

Methods, systems, and devices for split and duplicate ripple circuits are described. A ripple circuit may be divided into stages, which may operate in parallel. For example, a first stage may have a finite number of possibilities for an output that is relevant for a second stage, and the second stages may be replicated according to the finite number of possibilities. The replicated second stages thus may operate concurrently with each other and the first stage, with each of the replicated second stages assuming a different possible output from the first stage. Once operation of the first stage is complete, the true output of the first stage may be used to select one of the second stages as corresponding to the correct assumed output, and the output of the selected second stage may be or may be included in a set of output signals for the circuit.

20 Claims, 8 Drawing Sheets

(51) Int. Cl.
  *G06F 7/501*  (2006.01)
  *G06F 7/503*  (2006.01)
(58) Field of Classification Search
  USPC .................................................. 708/671, 207
  See application file for complete search history.

(56) References Cited

U.S. PATENT DOCUMENTS

| | | | |
|---|---|---|---|
| 2002/0111976 A1* | 8/2002 | Hossain | G06F 7/02 |
| | | | 708/200 |
| 2002/0143841 A1 | 10/2002 | Farooqui et al. | |
| 2018/0164372 A1 | 6/2018 | Rubin et al. | |
| 2020/0125505 A1 | 4/2020 | Brox et al. | |

OTHER PUBLICATIONS

Chinese Patent Office, "Office Action and Search Report", issued in connection with Chinese Patent Application No. 202110676443.2 dated Nov. 3, 2022 (9 pages).
Cheng, Shun-Wen, Jhen-Yuan Li, and Wei-Chi Chen, "High-Performance 128-Bit Comparator Based on Conditional Carry-Select Scheme", in Advances in Intelligent Systems and Applications, vol. 2, pp. 711-720, 2013 (Year: 2013).

* cited by examiner

SPLIT AND DUPLICATE RIPPLE CIRCUITS

CROSS REFERENCE

The present Application for Patent is a continuation of U.S. patent application Ser. No. 16/908,423 by Morgan, entitled "SPLIT AND DUPLICATE RIPPLE CIRCUITS," filed Jun. 22, 2020, assigned to the assignee hereof, and is expressly incorporated by reference in its entirety herein.

BACKGROUND

The following relates generally to one or more systems for memory and more specifically to split and duplicate ripple circuits.

Memory devices are widely used to store information in various electronic devices such as computers, wireless communication devices, cameras, digital displays, and the like. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, a component of the device may read, or sense, at least one stored state in the memory device. To store information, a component of the device may write, or program, the state in the memory device.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), and others. Memory devices may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source. FeRAM may be able to achieve densities similar to volatile memory but may have non-volatile properties due to the use of a ferroelectric capacitor as a storage device.

DETAILED DESCRIPTION

Some circuits may include multiple stages, where the output of one stage depends on the outcome of a prior stage. For example, the stages may be arranged serially (e.g., sequentially). Such circuits may in some cases be referred to as ripple circuits (e.g., ripple adders, ripple comparators, ripple counters, etc.). In some cases, these circuits may have latency drawbacks as delays associated with each stage may be additive and ripple through the circuit.

According to the techniques described herein, stages of a ripple circuit may be divided into multiple shorter portions, which may operate in parallel, and at least some of which may be replicated (e.g., duplicated). For example, a prior stage may have a finite number of possibilities for an output (e.g., two possibilities for the output) that is relevant for one or more later stages, and the later stages may be replicated according to the finite number of possible outputs for the prior stage. As used herein, prior and later or like terms may refer to a mathematical order of operations but not necessarily to a temporal order in which those operations are performed. The replicated later stages thus may operate in parallel (e.g., concurrently with each other and with the prior stage), where each of the replicated stages may operate based on a respective input signal corresponding to one of the different possible outputs from the prior stage. Once operations of the prior stage are complete, the actual output of the prior stage may be used to select one of the replicated later stages as corresponding to the actual output, and the output of the selected later stage may be or may be included in a set of output signals for the circuit. In some example ripple circuits, the set of output signals for the circuit may include one or more output signals based on the result of the prior stage.

Features of the disclosure are initially described in the context of systems and dies as described with reference to FIGS. 1-2. Features of the disclosure are described in the context of example circuits as described with reference to FIGS. 3-7. These and other features of the disclosure are further illustrated by and described with reference to a flowchart that relates to split and duplicate ripple circuits as described with reference to FIG. 8.

Figure 1:
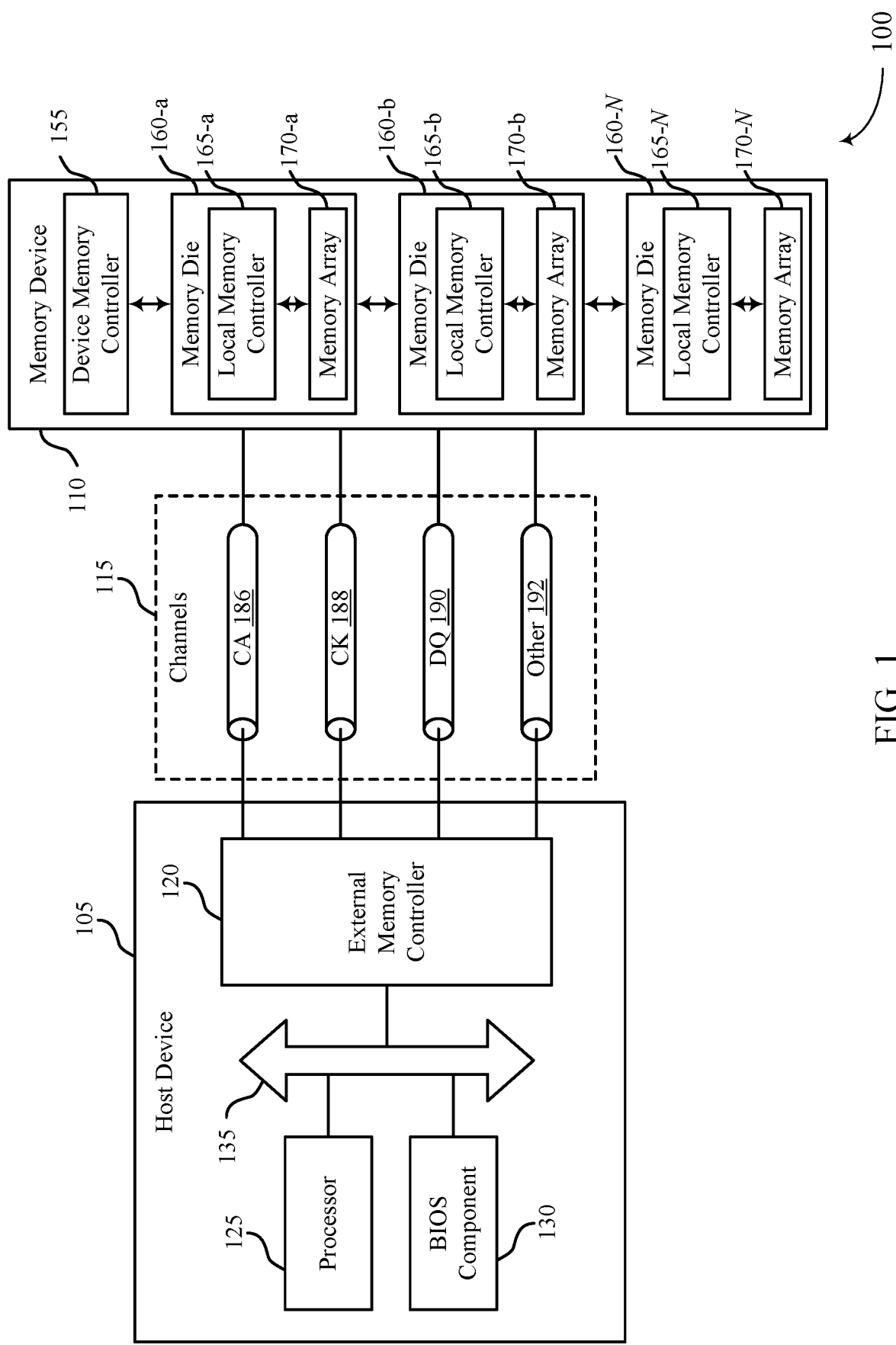
FIG. 1 illustrates an example of a system that supports split and duplicate ripple circuits in accordance with examples as disclosed herein.

FIG. 1 illustrates an example of a system 100 that supports split and duplicate ripple circuits in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110). Aspects of the system 100 and other examples here may be described in the context of one or more particular types of memory devices; however, the techniques and structures described herein may be implemented in any type of memory device or any other type of electronic device.

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system operable to store data for one or more other components of the system 100.

At least portions of the system 100 may be examples of the host device 105. The host device 105 may be an example of a processor or other circuitry within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host or a host device 105.

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other factors.

The memory device 110 may be operable to store data for the components of the host device 105. In some examples, the memory device 110 may act as a slave-type device to the host device 105 (e.g., responding to and executing commands provided by the host device 105 through the external memory controller 120). Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of host device may be in coupled with one another using a bus 135.

The processor 125 may be operable to provide control or other functionality for at least portions of the system 100 or at least portions of the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general purpose GPU (GPGPU), or a system on a chip (SoC), among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include a program or software stored in one or more of read-only memory (ROM), flash memory, or other non-volatile memory.

In some examples, the system 100 or the host device 105 may include various peripheral components. The peripheral components may be any input device or output device, or an interface for such devices, that may be integrated into or with the system 100 or the host device 105. Examples may include one or more of: a disk controller, a sound controller, a graphics controller, an Ethernet controller, a modem, a universal serial bus (USB) controller, a serial or parallel port, or a peripheral card slot such as peripheral component interconnect (PCI) or specialized graphics ports. The peripheral component(s) may be other components understood by a person having ordinary skill in the art as a peripheral.

In some examples, the system 100 or the host device 105 may include an I/O controller. An I/O controller may manage data communication between the processor 125 and the peripheral component(s), input devices, or output devices. The I/O controller may manage peripherals that are not integrated into or with the system 100 or the host device 105. In some examples, the I/O controller may represent a physical connection or port to external peripheral components.

In some examples, the system 100 or the host device 105 may include an input component, an output component, or both. An input component may represent a device or signal external to the system 100 that provides information, signals, or data to the system 100 or its components. In some examples, and input component may include a user interface or interface with or between other devices. In some examples, an input component may be a peripheral that interfaces with system 100 via one or more peripheral components or may be managed by an I/O controller. An output component may represent a device or signal external to the system 100 operable to receive an output from the system 100 or any of its components. Examples of an output component may include a display, audio speakers, a printing device, another processor on a printed circuit board, and others. In some examples, an output may be a peripheral that interfaces with the system 100 via one or more peripheral components or may be managed by an I/O controller.

The memory device 110 may include a device memory controller 155 and one or more memory dies 160 (e.g., memory chips) to support a desired capacity or a specified capacity for data storage. Each memory die 160 may include a local memory controller 165 (e.g., local memory controller 165-a, local memory controller 165-b, local memory controller 165-N) and a memory array 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store at least one bit of data. A memory device 110 including two or more memory dies may be referred to as a multi-die memory or a multi-die package or a multi-chip memory or a multi-chip package.

The device memory controller 155 may include circuits, logic, or components operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may receive data or commands or both from the host device 105. For example, the memory device 110 may receive a write command indicating that the memory device 110 is to store data for the host device 105 or a read command indicating that the memory device 110 is to provide data stored in a memory die 160 to the host device 105.

A local memory controller 165 (e.g., local to a memory die 160) may be operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165, or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other circuits or controllers operable for supporting described operations of the device memory controller 155 or local memory controller 165 or both.

The external memory controller 120 may be operable to enable communication of one or more of information, data, or commands between components of the system 100 or the host device 105 (e.g., the processor 125) and the memory device 110. The external memory controller 120 may convert or translate communications exchanged between the components of the host device 105 and the memory device 110. In some examples, the external memory controller 120 or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be examples of transmission mediums that carry information between the host device 105 and the memory device. Each channel 115 may include one or more signal paths or transmission mediums (e.g., conductors) between terminals associated with the components of system 100. A signal path may be an example of a conductive path operable to carry a signal. For example, a channel 115 may include a first terminal including one or more pins or pads at the host device 105 and one or more pins or pads at the memory device 110. A pin may be an example of a conductive input or output point of a device of the system 100, and a pin may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

At least some components of the system 100 (e.g., memory dies 160) may include circuits with multiple stages, where the output of one stage depends on the output (e.g., outcome) of a prior stage. Such circuits may in some cases be referred to as ripple circuits (e.g., ripple adders, ripple comparators, ripple counters, etc.). As one example, a local memory controller 165 may include a ripple adder circuit for resolving an address of a memory cell within a memory array 170. The stages of these circuits may be arranged serially. In some cases, these circuits may have latency drawbacks as delays associated with each stage may be additive and ripple through the circuit.

According to the techniques described herein, stages of a ripple circuit may be divided into multiple shorter portions, which may operate in parallel. For example, a prior stage may have a finite number of possible results (e.g., two possible output voltages or other possible forms of an output signal) that are relevant for later stages, and the later stages may be replicated according to the finite number of possible results for the prior stage. The replicated later stages thus may operate in parallel (e.g., concurrently with each other and with the prior stage), where each of the replicated stages may operate based on a different possible result from the prior stage. Once operations of the prior stage are complete, the actual result of the prior stage may be used to select one of the replicated later stages as corresponding to the actual result, and the output of the selected later stage may be or may be included in a set of output signals for the circuit. In some example ripple circuits, the set of output signals for the circuit may include one or more output signals based on the result of the prior stage.

Figure 2:
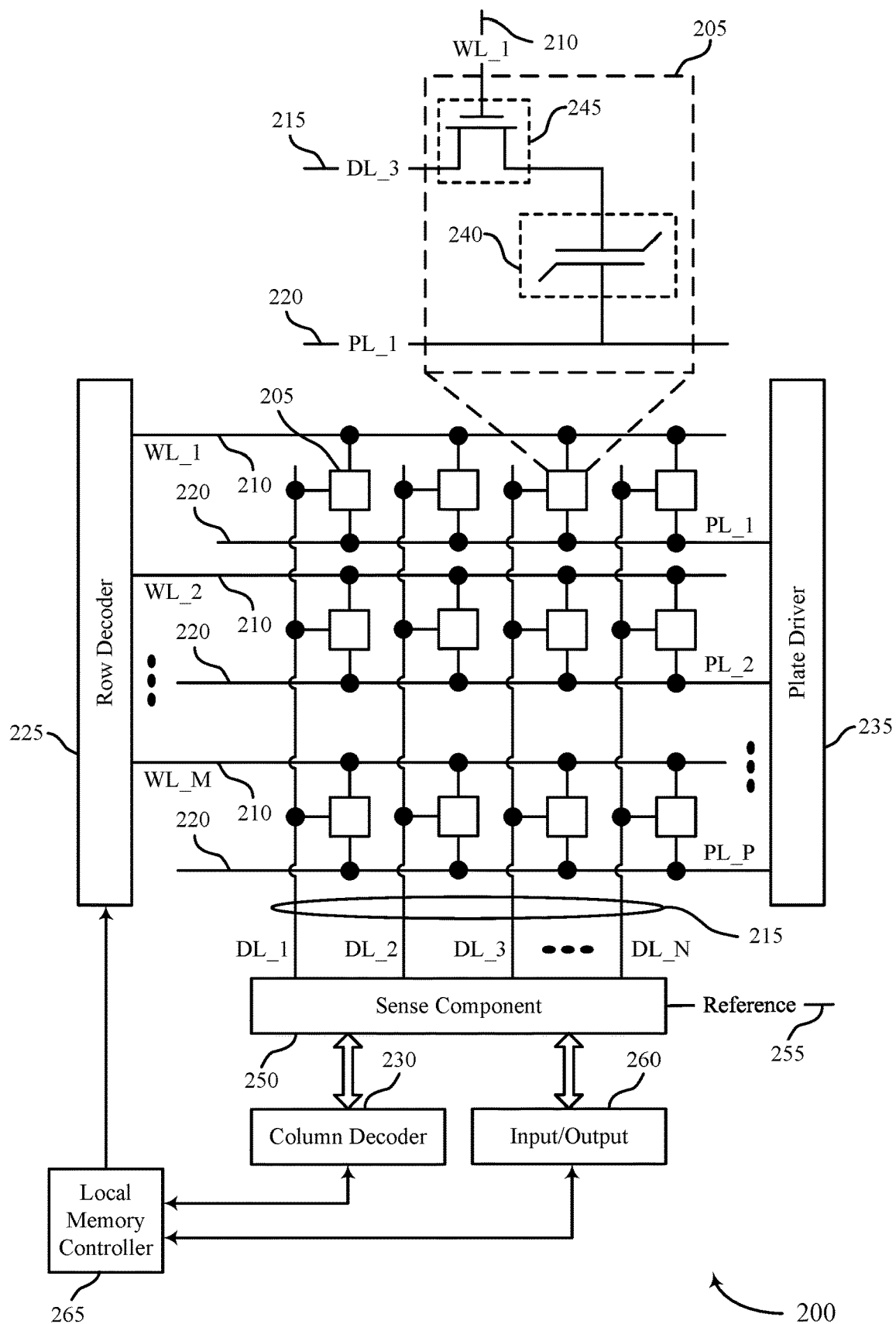
FIG. 2 illustrates an example of a memory die that supports split and duplicate ripple circuits in accordance with examples as disclosed herein.

FIG. 2 illustrates an example of a memory die 200 that supports split and duplicate ripple circuits in accordance with examples as disclosed herein. The memory die 200 may be an example of the memory dies 160 described with reference to FIG. 1. In some examples, the memory die 200 may be referred to as a memory chip, a memory device, or an electronic memory apparatus. Aspects of the memory die 200 and other examples here may be described in the context of one or more particular types of memory devices; however, the techniques and structures described herein may be implemented in any type of memory device or any other type of electronic device.

The memory die 200 may include one or more memory cells 205 that may each be programmable to store different logic states (e.g., programmed to one of a set of two or more possible states). For example, a memory cell 205 may be operable to store one bit of information at a time (e.g., a logic 0 or a logic 1). In some examples, a memory cell 205 (e.g., a multi-level memory cell) may be operable to store more than one bit of information at a time (e.g., a logic 00, logic 01, logic 10, a logic 11). In some examples, the memory cells 205 may be arranged in an array, such as a memory array 170 described with reference to FIG. 1.

A memory cell 205 may store a state (e.g., polarization state or dielectric charge) representative of the programmable states in a capacitor. In FeRAM architectures, as one example, the memory cell 205 may include a capacitor 240 that includes a ferroelectric material to store a charge and/or a polarization representative of the programmable state. The memory cell 205 may include a logic storage component, such as capacitor 240, and a switching component 245. The capacitor 240 may be an example of a ferroelectric capacitor. A first node of the capacitor 240 may be coupled with the switching component 245 and a second node of the capacitor 240 may be coupled with a plate line 220. The switching component 245 may be an example of a transistor or any other type of switch device that selectively establishes or de-establishes electronic communication between two components.

The memory die 200 may include access lines (e.g., the word lines 210, the digit lines 215, and the plate lines 220) arranged in a pattern, such as a grid-like pattern. An access line may be a conductive line coupled with a memory cell 205 and may be used to perform access operations on the memory cell 205. In some examples, word lines 210 may be referred to as row lines. In some examples, digit lines 215 may be referred to as column lines or bit lines. References to access lines, row lines, column lines, word lines, digit lines, bit lines, or plate lines, or their analogues, are interchangeable without loss of understanding or operation. Memory cells 205 may be positioned at intersections of the word lines 210, the digit lines 215, and/or the plate lines 220.

Operations such as reading and writing may be performed on memory cells 205 by activating or selecting access lines such as a word line 210, a digit line 215, and/or a plate line 220. By biasing a word line 210, a digit line 215, and a plate line 220 (e.g., applying a voltage to the word line 210, digit line 215, or plate line 220), a single memory cell 205 may be accessed at their intersection. Activating or selecting a word line 210, a digit line 215, or a plate line 220 may include applying a voltage to the respective line.

Accessing the memory cells 205 may be controlled through a row decoder 225, a column decoder 230, and a plate driver 235. For example, a row decoder 225 may receive a row address from the local memory controller 265 and activate a word line 210 based on the received row address. A column decoder 230 receives a column address from the local memory controller 265 and activates a digit line 215 based on the received column address. A plate driver 235 may receive a plate address from the local memory controller 265 and activates a plate line 220 based on the received plate address.

Selecting or deselecting the memory cell 205 may be accomplished by activating or deactivating the switching component 245. The capacitor 240 may be in electronic communication with the digit line 215 using the switching component 245. For example, the capacitor 240 may be isolated from digit line 215 when the switching component 245 is deactivated, and the capacitor 240 may be coupled with digit line 215 when the switching component 245 is activated.

The sense component 250 may determine a state (e.g., a polarization state or a charge) stored on the capacitor 240 of the memory cell 205 and determine a logic state of the memory cell 205 based on the detected state. The sense component 250 may include one or more sense amplifiers to amplify the signal output of the memory cell 205. The sense component 250 may compare the signal received from the memory cell 205 across the digit line 215 to a reference 255 (e.g., a reference voltage). The detected logic state of the memory cell 205 may be provided as an output of the sense component 250 (e.g., to an input/output 260), and may indicate the detected logic state to another component of a memory device 110 that includes the memory die 200.

The local memory controller 265 may control the operation of memory cells 205 through the various components (e.g., row decoder 225, column decoder 230, plate driver 235, and sense component 250). The local memory controller 265 may be an example of the local memory controller 165 described with reference to FIG. 1. In some examples, one or more of the row decoder 225, column decoder 230, and plate driver 235, and sense component 250 may be co-located with the local memory controller 265. The local memory controller 265 may be operable to receive one or more of commands or data from one or more different memory controllers (e.g., an external memory controller 120 associated with a host device 105, another controller associated with the memory die 200), translate the commands or the data (or both) into information that can be used by the memory die 200, perform one or more operations on the memory die 200, and communicate data from the memory die 200 to a host device 105 based on performing the one or more operations. The local memory controller 265 may generate row signals and column address signals to activate the target word line 210, the target digit line 215, and the target plate line 220. The local memory controller 265 may also generate and control various voltages or currents used during the operation of the memory die 200. In general, the amplitude, the shape, or the duration of an applied voltage or current discussed herein may be varied and may be different for the various operations discussed in operating the memory die 200.

The local memory controller 265 may be operable to perform one or more access operations on one or more memory cells 205 of the memory die 200. Examples of access operations may include a write operation, a read operation, a refresh operation, a precharge operation, or an activate operation, among others. In some examples, access operations may be performed by or otherwise coordinated by the local memory controller 265 in response to various access commands (e.g., from a host device 105). The local memory controller 265 may be operable to perform other access operations not listed here or other operations related to the operating of the memory die 200 that are not directly related to accessing the memory cells 205.

The local memory controller 265 may be operable to perform a write operation (e.g., a programming operation) on one or more memory cells 205 of the memory die 200. During a write operation, a memory cell 205 of the memory die 200 may be programmed to store a desired logic state. The local memory controller 265 may identify a target memory cell 205 on which to perform the write operation. The local memory controller 265 may identify a target word line 210, a target digit line 215, and a target plate line 220 coupled with the target memory cell 205. The local memory controller 265 may activate the target word line 210, the target digit line 215, and the target plate line 220 (e.g., applying a voltage to the word line 210, digit line 215, or plate line 220) to access the target memory cell 205. The local memory controller 265 may apply a specific signal (e.g., write pulse) to the digit line 215 during the write operation to store a specific state (e.g., charge) in the capacitor 240 of the memory cell 205. The pulse used as part of the write operation may include one or more voltage levels over a duration.

The local memory controller 265 may be operable to perform a read operation (e.g., a sense operation) on one or more memory cells 205 of the memory die 200. During a read operation, the logic state stored in a memory cell 205 of the memory die 200 may be determined. The local memory controller 265 may identify a target memory cell 205 on which to perform the read operation. The local memory controller 265 may identify a target word line 210, a target digit line 215, and target plate line 220 coupled with the target memory cell 205. The local memory controller 265 may activate the target word line 210, the target digit line 215, and the target plate line 220 (e.g., applying a voltage to the word line 210, digit line 215, or plate line 220) to access the target memory cell 205. The target memory cell 205 may transfer a signal to the sense component 250 in response to biasing the access lines. The sense component 250 may amplify the signal. The local memory controller 265 may activate the sense component 250 (e.g., latch the sense component) and thereby compare the signal received from the memory cell 205 to the reference 255. Based on that comparison, the sense component 250 may determine a logic state that is stored on the memory cell 205.

Memory die 200 may include one or more circuits that each include multiple stages, where the output of one stage depends on the outcome of a prior stage. Such circuits may in some cases be referred to as ripple circuits (e.g., ripple adders, ripple comparators, ripple counters, etc.). As one example, a local memory controller 265 may include a ripple adder circuit for resolving an address of a memory cell 205 within a memory array. The stages of these circuits may be arranged serially. In some cases, these circuits may have latency drawbacks as delays associated with each stage may be additive and ripple through the circuit.

According to the techniques described herein, stages of a ripple circuit may be divided into multiple shorter portions, which may operate in parallel. For example, a prior stage may have a finite number of possible results (e.g., two possible results) that are relevant for later stages, and the later stages may be replicated according to the finite number of possible results for the prior stage. The replicated later stages thus may operate in parallel (e.g., concurrently with each other and with the prior stage), where each of the replicated stages may operate based on a different possible result from the prior stage. Once operations of the prior stage are complete, the actual result of the prior stage may be used to select one of the replicated later stages as corresponding to the actual result, and the output of the selected later stage may be or may be included in a set of output signals for the circuit. In some example ripple circuits, the set of output signals for the circuit may include one or more output signals based on the result of the prior stage.

Figure 3:
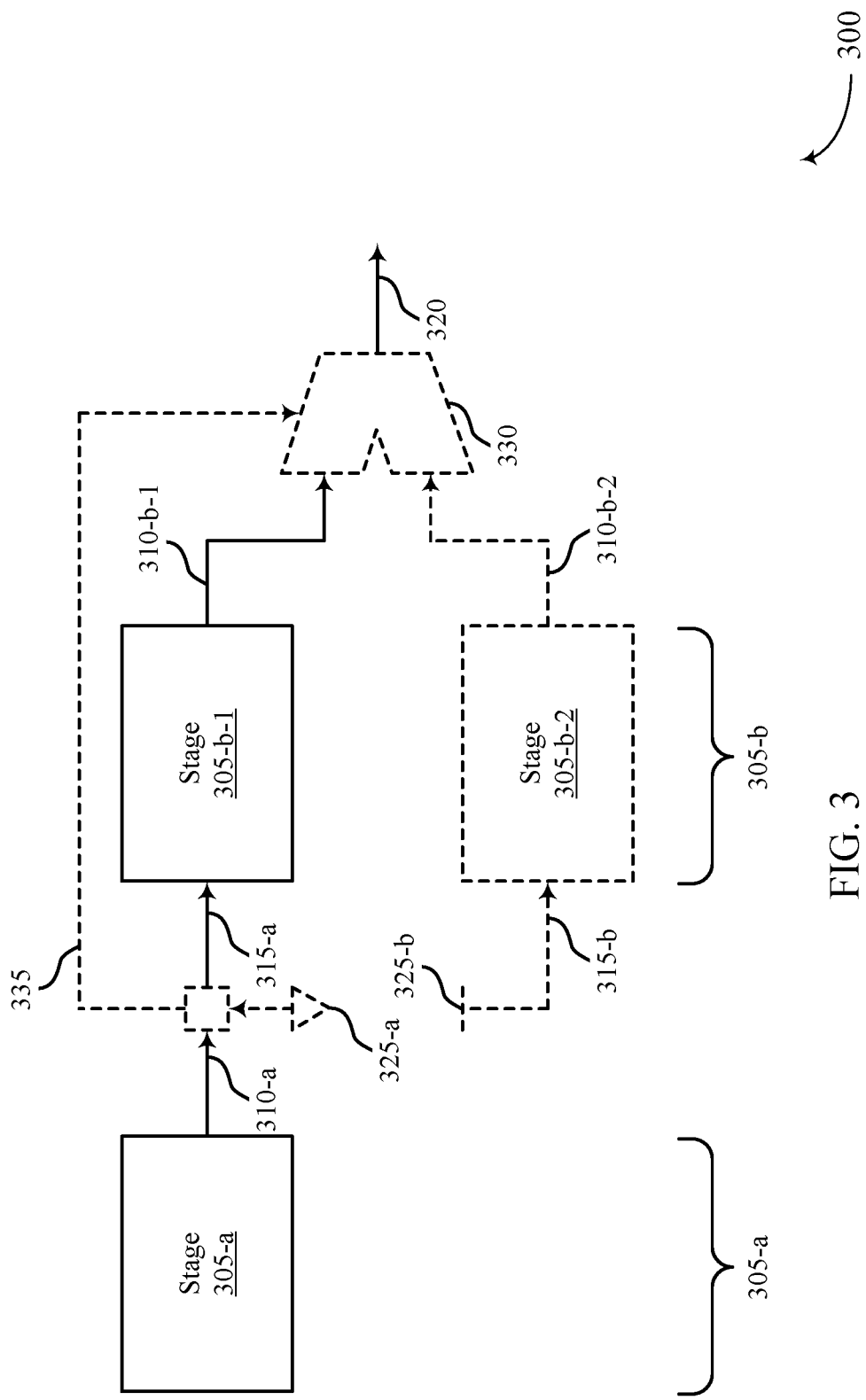
FIG. 3 illustrates an example of a circuit that supports split and duplicate ripple circuits in accordance with examples as disclosed herein.

FIG. 3 illustrates an example of a circuit 300 that supports split and duplicate ripple circuits in accordance with examples as disclosed herein. The circuit 300 may be an example of a ripple circuit, which may be included in one or more aspects of a memory die or a memory device as described with reference to FIGS. 1 and 2.

The circuit 300 may include multiple stages 305, and an output 310 of at least one stage 305 may depend on an outcome of a prior stage 305. An output 310 may refer to a signal (e.g., an electric signal), a state of a signal (e.g., high or low, active or inactive), or any characteristic of a signal (e.g., a voltage amplitude or polarity of a signal, a current amplitude or polarity of a signal), or any combination thereof. As illustrated in FIG. 3, the stages 305 of the circuit 300 may be arranged serially. For example, an input 315-*a* of a stage 305-*b* may be based on an output 310-*a* of a stage 305-*a*. Accordingly, an output 310-*b* of the stage 305-*b* may be based on the output 310-*a*, as well as internal outputs (not shown) one or more operations performed in the stage 305-*b*. A circuit output 320 may include one or more output signals based on the output 310-*b* of the stage 305-*b* and in some examples may further include one or more output signals based on the output 310-*a* of the stage 305-*a*.

According to the techniques described herein, some or all of the stages 305 may operate in parallel (e.g., concurrently) to improve efficiency in the circuit 300 (e.g., to avoid or mitigate latency drawbacks due to delays associated with individual stages 305 cumulatively adding to create an overall latency for the circuit 300). In some examples, there may be a finite number of possibilities for the output 310-*a* of the stage 305-*a* (e.g., the output 310-*a* may be either a logic 1 or a logic 0, depending on the value of an input to the stage 305-*a*). For example, the output 310-*a* may include a carry value 325 for which two possibilities exist, such as a carry value 325-*a* or a carry value 325-*b*. In some examples, the carry value 325 may correspond to or represent a logic value (e.g., a logic "0" or a logic "1") or a voltage level (e.g., a high voltage level or a low voltage level such as a ground voltage level) informs the operations in the stage 305-*b*.

To operate the stages 305 in parallel, the circuit 300 may include duplicative circuit components for stage 305-*b*, with stage 305-*b*-1 and stage 305-*b*-2 comprising like components and configured to perform like operations, but based on different input signals 315-*a* and 315-*b* corresponding to different possibilities for the output 310-*a* of stage 305-*a*. For example, the stage 305-*b*-1 may include a set of one or more components or circuitry, and the stage 305-*b*-2 may include a duplicate set of the one or more components or circuitry. The stage 305-*b*-1 may perform operations based on assuming the output 310-*a* includes the carry value 325-*a*, and the stage 305-*b*-2 may perform the operations based on assuming the output 310-*a* includes the carry value 325-*b*. Based on these assumptions, the stage 305-*b*-1 may generate an output 310-*b*-1 and the stage 305-*b*-2 may generate an output 310-*b*-2. In some examples, the stages 305-*b*-1 and 305-*b*-2 may operate concurrently with each other, and in some cases also concurrently with the prior stage 305-*a*.

The circuit 300 may include a selection component 330 for selecting which of the outputs 310-*b*-1 and 310-*b*-2 to use for generating the circuit output 320, where the selecting may occur once the operations of the stage 305-*a* are complete. The selection component 330 may make the selection based on an intermediate signal 335, which may indicate the actual carry value 325 in the output 310-*a*. For example, if the intermediate signal 335 indicates the carry value 325-*a*, the selection component 330 may select the output 310-*b*-1 for determining the circuit output 320. Similarly, if the intermediate signal 335 indicates the carry value 325-*b*, the selection component 330 may select the output 310-*b*-2 for determining the circuit output 320. In some examples, the selection component 330 may include a multiplexer (MUX) or a set of MUXes. In some examples, the intermediate signal 335 may indicate additional information based on the output 310-*a* for determining output signals based on the output 310-*a* to include in the circuit output 320.

The example of circuit 300 includes two stages 305-*a* and 305-*b*, with the second stage replicated twice as instantiated by stages 305-*b*-1 and 305-*b*-2. It is to be understood, however, that a ripple circuit as described herein may include (e.g., be divided into) any number of stages 305, which a given stage 305 replicated any number of times (e.g., to accommodate all possible outputs of prior stages 305, including all possible combinations of outputs of prior stages 305).

The circuit 300 may reduce latency by operating some or all of the stages 305 in parallel, which may improve efficiency in performing the operations of the stages 305. Additionally, the circuit 300 may illustrate structures and techniques with less complexity than other implementations (e.g., look ahead circuits). The techniques illustrated in the circuit 300 may be extended to any number of stages 305 or carry values 325.

Figure 4:
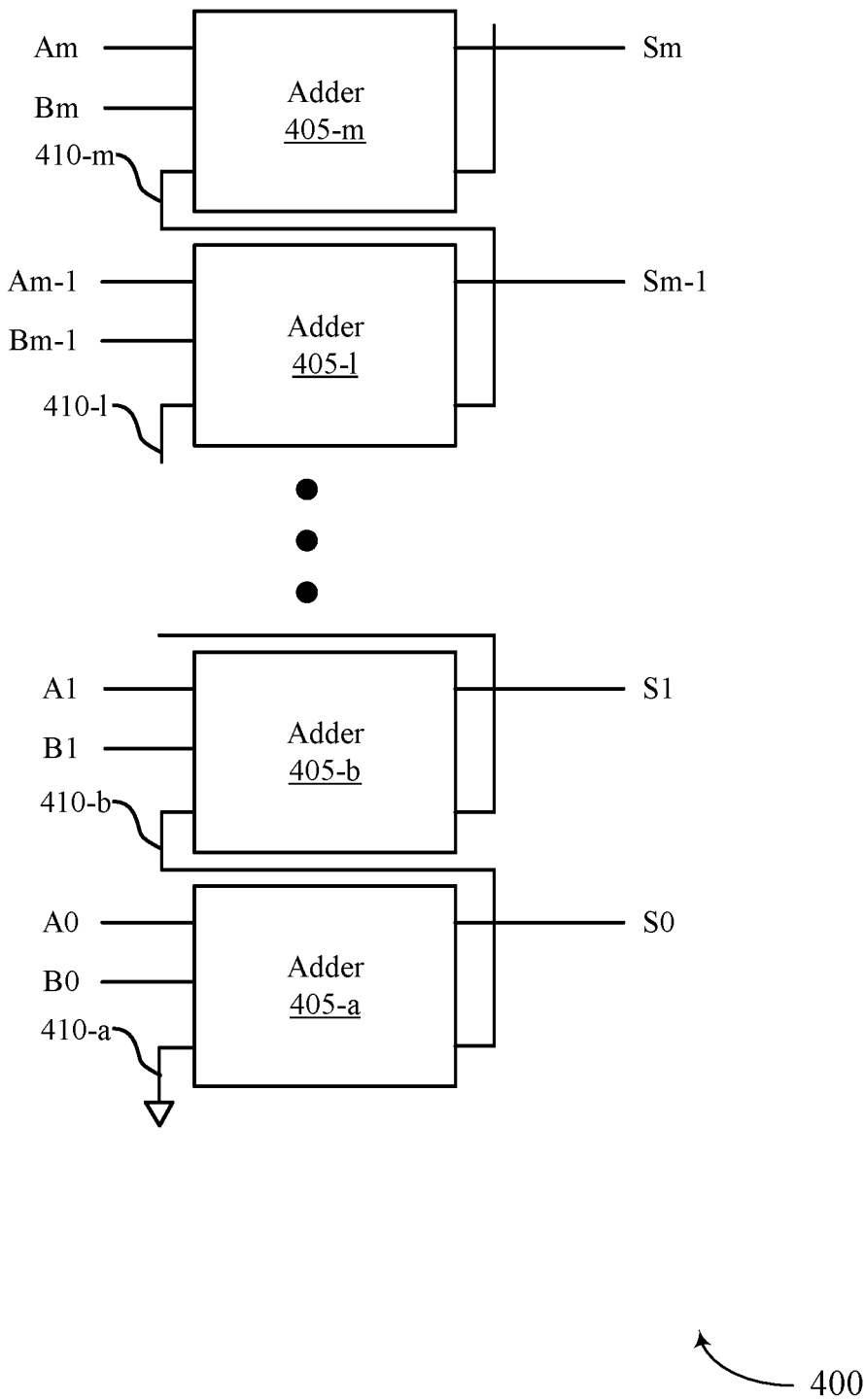
FIGS. 4 and 5 illustrate examples of adder circuits that support split and duplicate ripple circuits in accordance with examples as disclosed herein.

FIG. 4 illustrates an example of an adder circuit 400 that supports split and duplicate ripple circuits in accordance with examples as disclosed herein. The adder circuit 400 may be an example of a ripple circuit, which may be included in one or more aspects of a memory die or a memory device, or another type of electric device, as described with reference to FIGS. 1 and 2.

The adder circuit 400 may include any quantity of adders 405. In the example illustrated in FIG. 4, each adder 405 may represent a one-bit full adder. Each adder 405 may take three one-bit inputs, which may be represented as A, B, and Cin, and generate two outputs, which may be represented as S and Cout, where Cin and Cout may denote carry-in and carry-out respectively. In the adder circuit 400, the Cin input of a given adder 405 may be a carry value 410, and may be a Cout output of a prior adder 405. The output S generated by an adder 405 may indicate the sum of the A and B inputs of the adder 405. The adder circuit 400 may illustrate one example set of adder circuitry in which the techniques and structures described herein may be utilized; however, the techniques and structures described herein may be implemented in any type of adder circuitry.

As illustrated in FIG. 4, an adder 405-$a$ may add bits A0 and B0, which may represent least significant bits (LSBs) of the adder circuit 400. A carry value 410-$a$ for the adder 405-$a$ may be an initializing Cin for the adder circuit 400, which may represent a logic 0. The adder 405-$a$ may sum A0, B0, and Cin to generate outputs S0 and Cout. In some examples, the inputs and the outputs of the adder 405-$a$ may be related by the equality A0+B0+Cin=2Cout+S0. The output Cout of the adder 405-$a$ may be a carry value 410-$b$, which may serve as a Cin input for an adder 405-$b$.

An adder 405-$m$ may add bits Am and Bm, which may represent most significant bits (MSBs) of the adder circuit 400. A carry value 410-$m$ for the adder 405-$m$ may depend on an output of a previous adder 405-1, as well as each previous adder 405 in the adder circuit 400. Accordingly, the adder circuit 400 may have latency drawbacks as delays associated with each adder 405 may be additive and ripple through the adder circuit 400.

Figure 5:
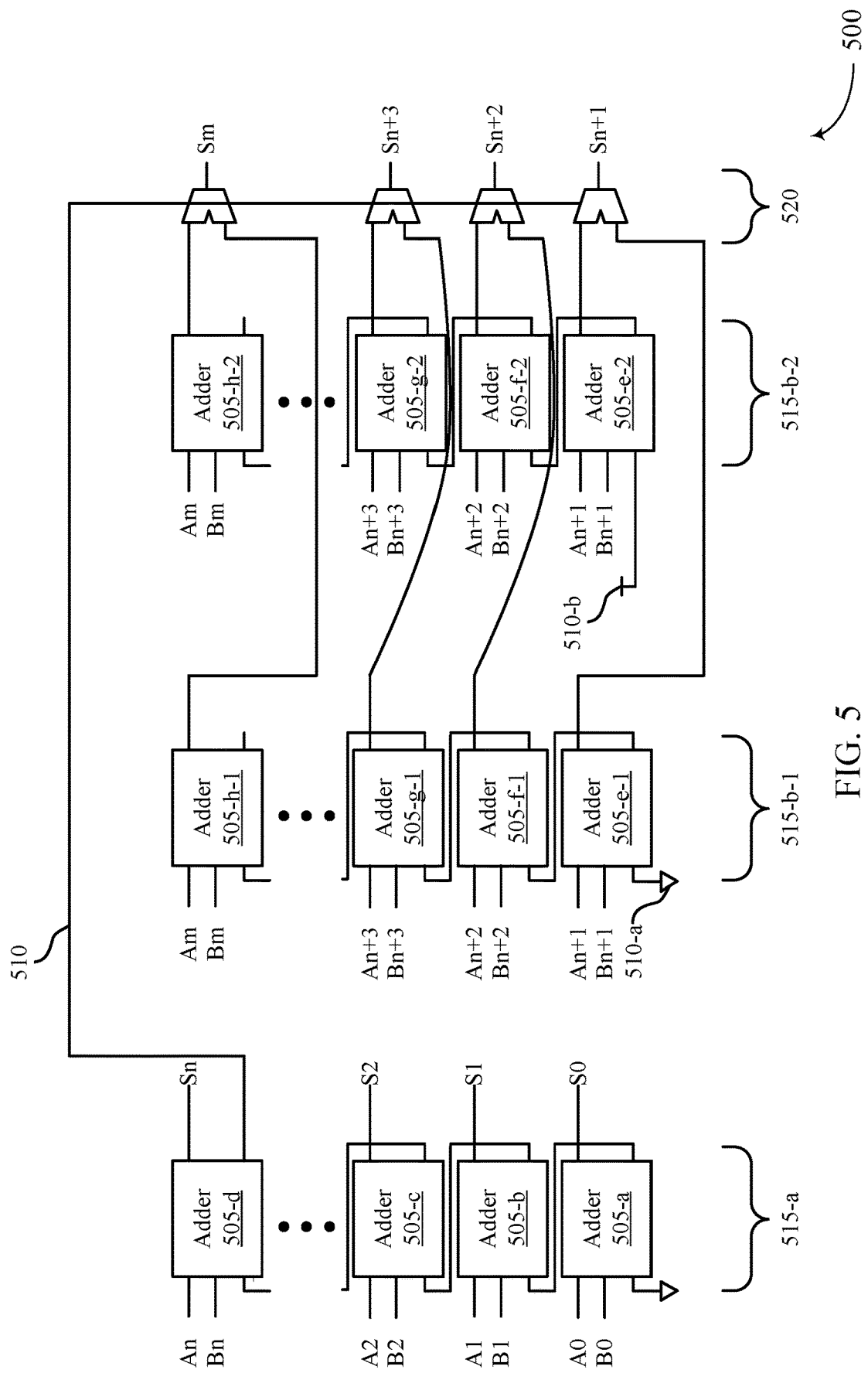

According to the techniques described herein, latency associated with the adder circuit 400 may be reduced by dividing stages of the adder circuit 400 into multiple shorter portions, which may operate in parallel, as described for example with reference to FIG. 5.

FIG. 5 illustrates an example of an adder circuit 500 that supports split and duplicate ripple circuits in accordance with examples as disclosed herein. The adder circuit 500 may be an example of a ripple circuit, which may be included in one or more aspects of a memory die or a memory device, or another type of electric device, as described with reference to FIGS. 1 and 2.

The adder circuit 500 may include adders 505 in sets 515. For example, a set 515-$a$ may include adders 505-$a$ through 505-$d$. According to the techniques described herein, the sets 515 may operate in parallel (e.g., concurrently) to improve efficiency in the adder circuit 500. The set 515-$a$ may add less significant bits of an m-bit number (e.g., bits 0 through n, where n is less than m) input to the adder circuit 500, including LSBs A0 and B0. Along with sum bits S0-Sn, the set 515-$a$ may be configured to generate and output a carry value 510, which may have a finite number of possible values (e.g., the set 515-$a$ may have two possible outputs, which may also be referred to as two possible results).

The adder circuit 500 may further include sets 515-$b$-1 and 515-$b$-2, which may be duplicative in terms of components and functions performed may operate based on a different inputs 510-$a$ and 510-$b$, where input 510-$a$ may correspond to one possible value (e.g., state) of the carry value 510 and input 510-$b$ may correspond to another possible value (e.g., state) of the carry value 510. The sets 515-$b$-1 and 515-$b$-2 may each include instances of adders 505-$e$ through 505-$h$, which may operate on more significant bits (e.g., bits n−1 through m of the m+1 bit number).

The set 515-$b$-1 may operate on the more significant bits to generate a first set of outputs (corresponding to a first possible set of bit values Sn+1 through Sm) based on assuming a carry value 510-$a$ from the set 515-$a$, and the set 515-$b$-2 may operate on the more significant bits to generate a second, alternative set of outputs (corresponding to a second possible set of bit values Sn+1 through Sm) based on assuming a carry value 510-$b$ from the set 515-$a$. In some examples, sets 515-$b$-1 and 515-$b$-2 may operate on the more significant bits concurrently with each other, and in some cases also with the set 515-$a$.

The adder circuit 500 may include a selection component 520 for selecting between the outputs of the set 515-$b$-1 and the set 515-$b$-2 for generating an overall output of the adder circuit 500, with the selecting occurring once the operations of the set 515-$a$ are complete. The selection component 520 may make the selections based on the actual carry value 510 from the set 515-$a$, which may be an example of an intermediate signal for the adder circuit 500. For example, if the carry value 510 matches the carry value 510-$a$, the selection component 520 may select the first set of S outputs generated by the set 515-$b$-1. Similarly, if the carry value 510 matches the carry value 510-$b$, the selection component 520 may select the second set of S outputs generated by the set 515-$b$-2. In some examples, the selection component 520 may include a set of one or more multiplexers. In some examples, one or more intermediate signals may indicate additional information based on the output of the set 515-$a$ (e.g., in addition to the carry value 510) for determining output signals based to include in the output of the adder circuit 500. For example, intermediate signals may include the outputs S0 through Sn, which may be included in the output of the adder circuit 500 along with a selected set of Sn+1 through Sm outputs, for an overall m+1 bit output of S0 through Sm bits.

The adder circuit 500 may reduce latency by operating the sets 515 in parallel, which may improve efficiency in performing the operations of the sets 515. Additionally, the adder circuit 500 may illustrate structures and techniques with less complexity than other implementations (e.g., look-ahead adders). The techniques illustrated in the adder circuit 500 may be extended to any number of sets 515 or carry values 510. For example, each stage may include one or more sets 515 of adders 505, where a carry value 510 of a set 515 of adders 505 may have a finite number of possible values (e.g., two possible values) that are relevant for one or more subsequent sets 515 of adders 505. The subsequent sets 515 of adders 505 may be replicated according to the finite number of possible results for the one or more carry values 510 of any prior set 515 of adders 505. The replicated later sets 515 thus may operate in parallel (e.g., concurrently with each other and in some cases with one or more prior sets 515), where each of the replicated sets 515 may operate based on a different possible set of one or more results from the one or more prior sets 515. Once operations of each prior set 515 are complete, the actual carry value 510 of a prior set may be used to select one of the replicated later sets 515 as corresponding to the actual carry value 510, and the output of the selected later set 515 may be included in a final sum computed by the set of adders 505.

Figure 6:
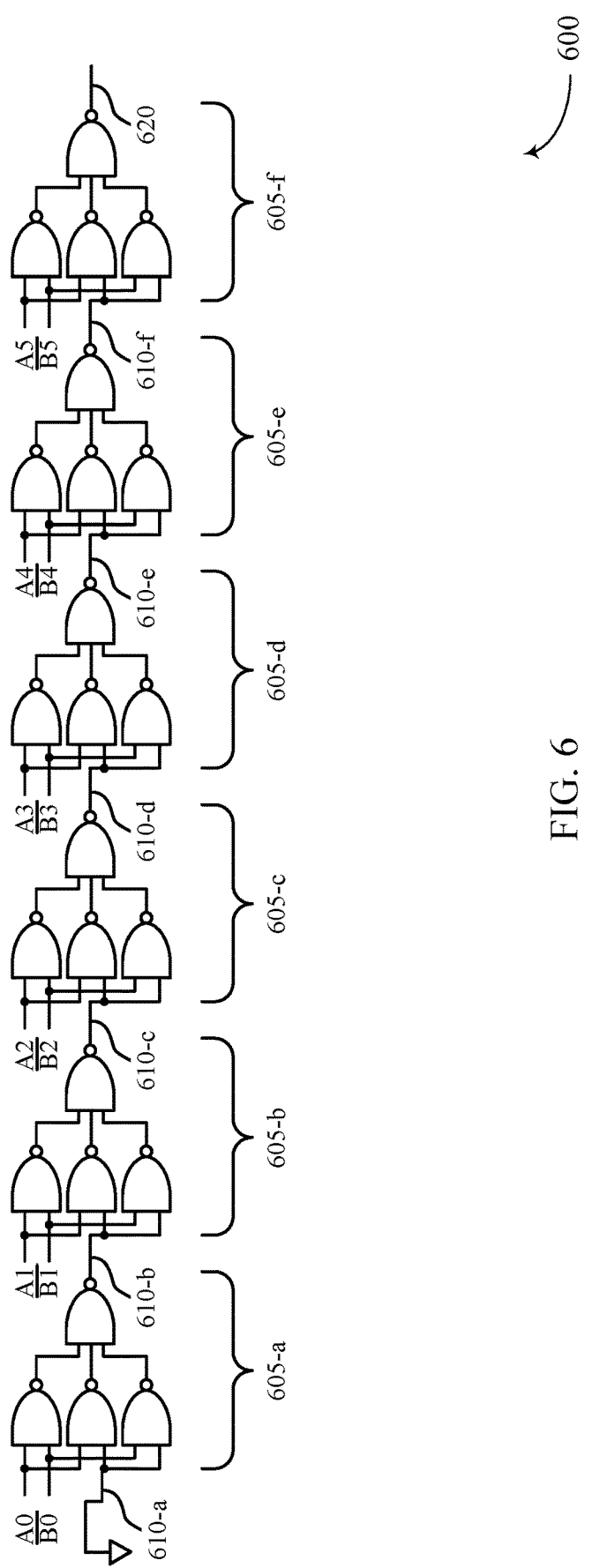
FIGS. 6 and 7 illustrate examples of comparator circuits that support split and duplicate ripple circuits in accordance with examples as disclosed herein.

FIG. 6 illustrates an example of a comparator circuit 600 that supports split and duplicate ripple circuits in accordance with examples as disclosed herein. The comparator circuit 600 may be an example of a ripple circuit, which may be included in one or more aspects of a memory die or a memory device, or another type of electric device, as described with reference to FIGS. 1 and 2.

The comparator circuit 600 may include a set of comparators 605. In the example illustrated in FIG. 6, each comparator 605 may represent a one-bit digital comparator. The comparator circuit 600 may be an example of a magnitude comparator, where the comparator circuit 600 may accept two inputs corresponding to two respective binary numbers A and B to determine whether A is greater than or equal to B or whether A is instead less than B. The numbers A and B may each be represented by a set of bits (e.g., six bits). For example, A may be represented by bits A0 though A5, where A5 may be an MSB of the bit representation of A, and where A0 may be an LSB of A. Each comparator 605 may include a set of not-and (NAND) logic gates for comparing a bit of A to an inverse of a corresponding bit of B. For example, a comparator 605-$a$ may compare a bit A0 to a bit $\overline{B0}$ (e.g., an inverse of B0) to determine whether A0 is greater than or equal to B0. The comparator circuit 600 may illustrate one example set of comparator circuitry in which the techniques and structures described herein may be utilized; however, the techniques and structures described herein may be implemented in any type of comparator circuitry.

In the comparator circuit 600, a given comparator 605 may compare corresponding bits of A and B based in part on a carry value 610, which may be an output of a prior comparator 605, to determine whether the A bit is greater than or equal to the corresponding B bit. A carry value 610-$a$ for the comparator 605-$a$ may be an initializing value for the comparator circuit 600, which may represent a logic 0. In an example, if A=2 (000010 in binary) and B=3 (000011 in binary), the set of bits representing A may include A0=0 and A1=1, and the set of bits representing B may include B0=1 and B1=1. Accordingly, the comparator 605-$a$ may determine that A0>B0 based on comparing A0 to $\overline{B0}$. The comparator 605-$a$ may output a carry value 610-$b$ indicating A0<B0. A comparator 605-$b$ may determine that A1=B1 based on comparing A1 to B1. Based on the comparison and the carry value 610-$b$, the comparator 605-$b$ may output a carry value 610-$c$ indicating that, at least with respect to the least significant two bits, A1A0<B1B0.

Each comparator 605 may have a delay associated with comparing corresponding bits A and B. In the example illustrated in FIG. 6, each comparator 605 may have a total delay corresponding to two gate delays through the NAND logic gates. Thus, the comparator circuit 600 may have total delay of up to twelve gate delays before a compare result 620 is generated.

Figure 7:
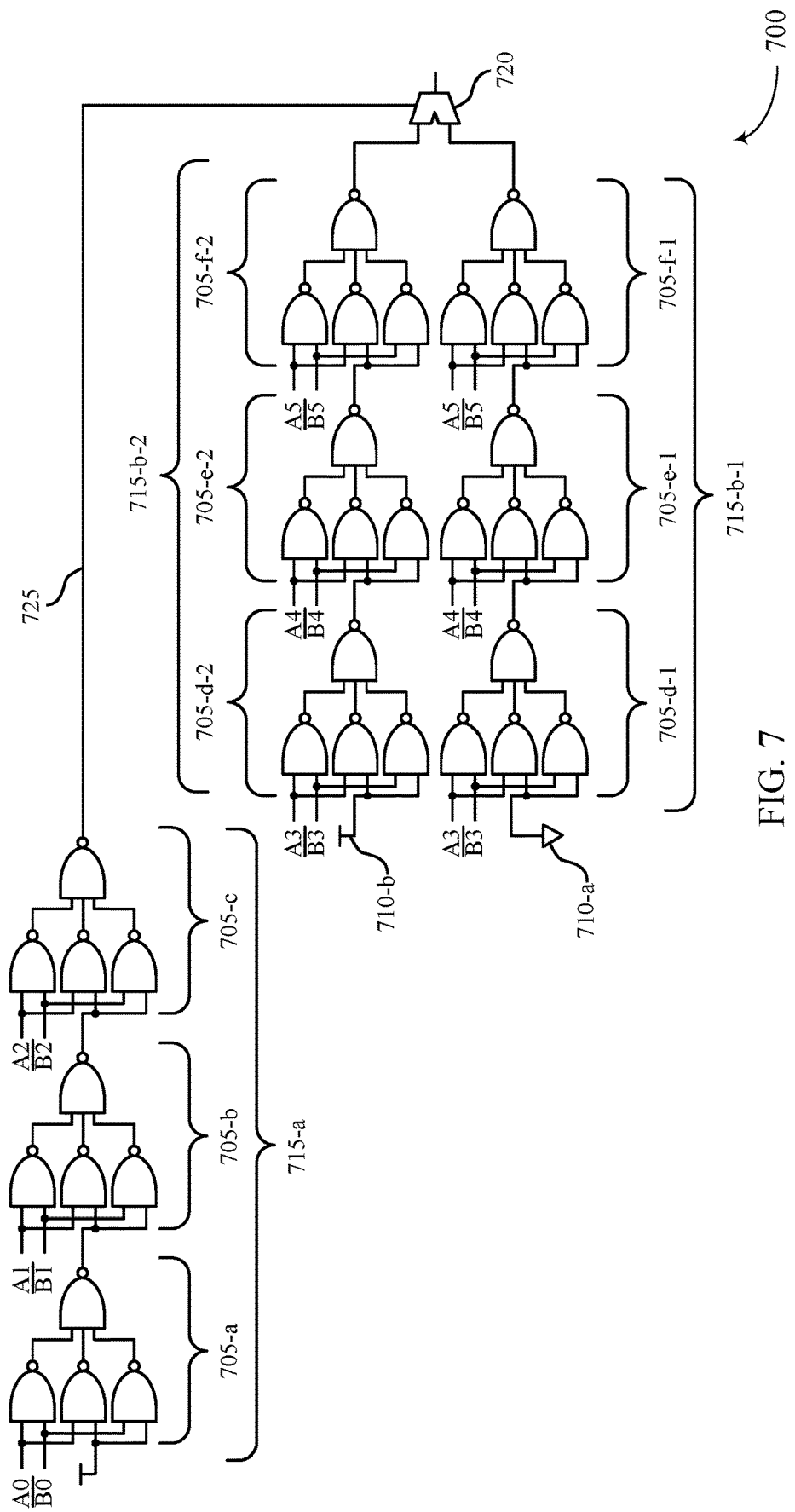

According to the techniques described herein, latency in the comparator circuit 600 may be reduced by dividing stages of the comparator circuit 600 into multiple shorter portions, which may operate in parallel, as described for example with reference to FIG. 7.

FIG. 7 illustrates an example of a comparator circuit 700 that supports split and duplicate ripple circuits in accordance with examples as disclosed herein. The comparator circuit 700 may be an example of a ripple circuit, which may be included in one or more aspects of a memory die or a memory device, or another type of electric device, as described with reference to FIGS. 1 and 2. The comparator circuit 700 may be an example of a magnitude comparator, where the comparator circuit 700 may accept two inputs corresponding to two respective binary numbers A and B to determine whether A is greater than or equal to B or whether A is instead less than B. The numbers A and B may each be represented by a set of bits (e.g., six bits).

The comparator circuit 700 may include comparators 705 in sets 715. For example, a set 715-$a$ may include comparators 705-$a$ through 705-$c$. The set 715-$a$ may compare less significant bits of numbers A and B, including LSBs A0 and B0. According to the techniques described herein, some or all of the sets 715 may operate in parallel (e.g., concurrently) to improve efficiency in the comparator circuit 700. A carry value 710 for the set 715-$a$ (e.g., corresponding to an overall compare result for the sets of bits associated with the set 715-$a$) may have a finite number of possible results (e.g., two possible results). For example, a carry value 710-$a$ may indicate that the three-bit number A2A1A0<B2B1B0, and a carry value 710-$b$ may indicate that A2A1A0>B2B1B0. Sets 715-$b$-1 and 715-$b$-2 may be duplicative in terms of components and functions performed but based on different possible carry values 710 for the set 715-$a$. The sets 715-$b$-1 and 715-$b$-2 may each include instances of comparators 705-$d$ through 705-$f$ and may operate on more significant bits of the numbers A and B.

The set 715-$b$-1 may compare the more significant bits to generate a first compare result based on assuming a carry value 710-$a$ from the set 715-$a$, and the set 715-$b$-2 may (e.g., concurrently) compare the more significant bits to generate a second compare result based on assuming a carry value 710-$b$ from the set 715-$a$. In some examples, sets 715-$b$-1 and 715-$b$-2 may compare the more significant bits concurrently with the set 715-$a$ comparing the less significant bits.

The comparator circuit may include a selection component 720 for selecting which compare result to use for generating an output of the comparator circuit 700 once the operations of the set 715-$a$ are complete. The selection component 720 may make the selections based on an intermediate signal 725, which may indicate the actual carry value 710 from the set 715-$a$. For example, if the intermediate signal 725 indicates the carry value 710-$a$, the selection component 720 may select the first compare result generated by the set 715-$b$-1. Similarly, if the intermediate signal 725 indicates the carry value 710-$b$, the selection component 720 may select the second compare result generated by the set 715-$b$-2. In some examples, the selections component 720 may include one or more multiplexers. In some examples, the intermediate signal 725 may indicate additional information based on the output of the set 715-$a$ for determining output signals based to include in the output of the comparator circuit 700.

The comparator circuit 700 may reduce latency by operating the sets 715 in parallel, which may improve efficiency in performing the operations of the sets 715.

Additionally, the comparator circuit 700 may illustrate structures and techniques with less complexity than other implementations (e.g., look ahead circuits). The techniques illustrated in the comparator circuit 700 may be extended to any number of sets 715 or carry values 710. Each stage may include one or more sets 715 of comparators 705, where a carry value 710 of a set of comparators 705 may have a finite number of possible results (e.g., two possible results) that are relevant for a subsequent set 715 of comparators 705. Subsequent sets 715 of comparators 705 may be replicated according to the finite number of possible results for the carry value 710 of each prior set 715 of comparators 705. The replicated later sets 715 thus may operate in parallel (e.g., concurrently with each other and in some cases with one or more with the prior sets 715), where each of the replicated sets 715 may operate based on a different possible result from the prior set 715. Once operations of any relevant prior set 715 are complete, the actual carry value 710 of the prior set 715 may be used to select one of the replicated later set 715 as corresponding to the actual carry value 710, and the output of the selected later set 715 may be included in a final compare result 720 computed by the set of comparators 705.

Figure 8:
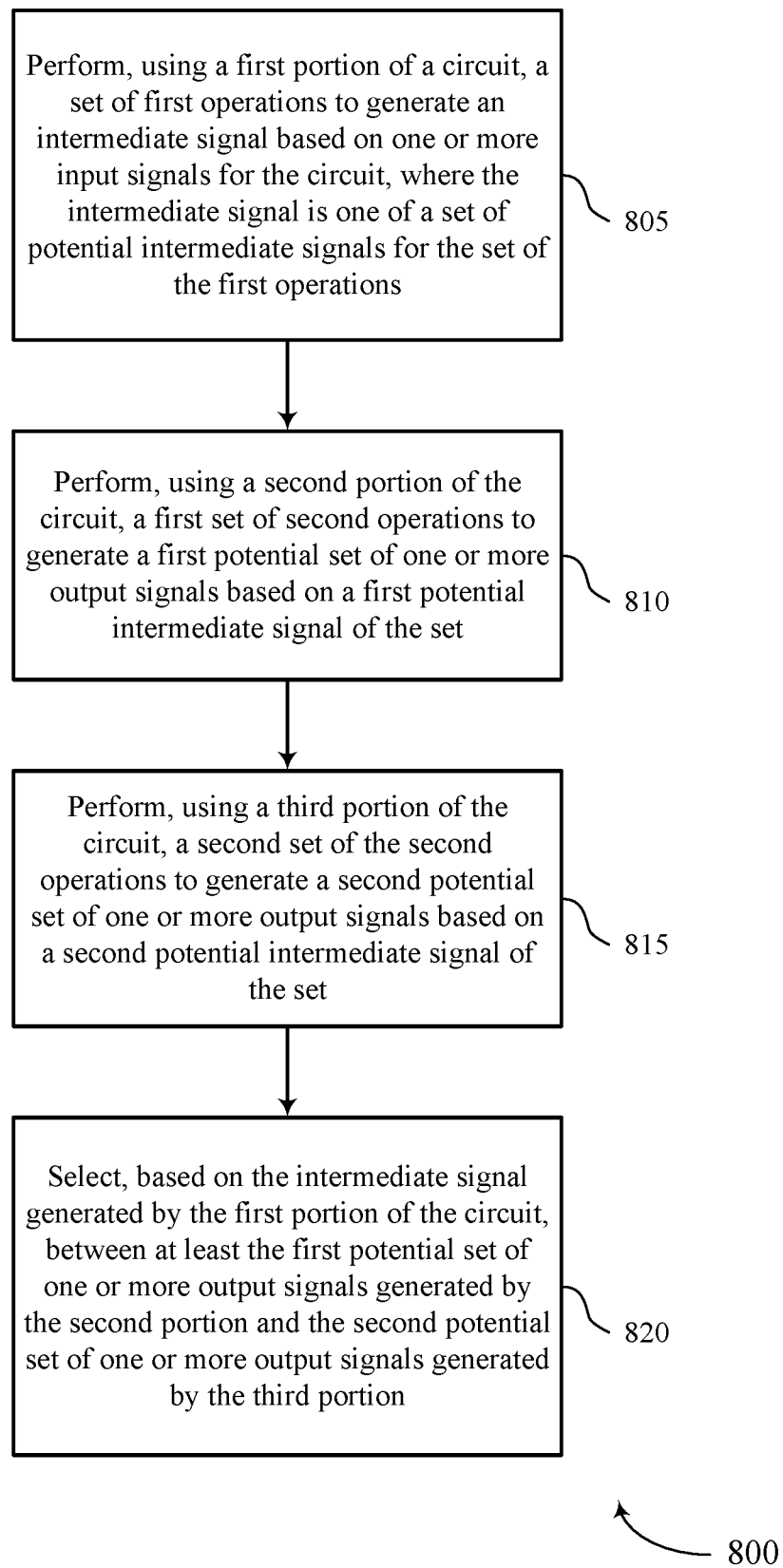
FIG. 8 shows a flowchart illustrating a method or methods that support split and duplicate ripple circuits in accordance with examples as disclosed herein.

FIG. 8 shows a flowchart illustrating a method or methods 800 that supports split and duplicate ripple circuits in accordance with aspects of the present disclosure. The operations of method 800 may be implemented by a circuit or its components as described herein. In some examples, a circuit may perform aspects of the described functions using special-purpose hardware.

At 805, the circuit may perform, using a first portion of a circuit, a set of first operations to generate an intermediate signal based on one or more input signals for the circuit, where the intermediate signal is one of a set of potential intermediate signals for the set of the first operations. The operations of 805 may be performed according to the methods described herein or by apparatuses as described herein.

At 810, the circuit may perform, using a second portion of the circuit, a first set of second operations to generate a first potential set of one or more output signals based on a first potential intermediate signal of the set. The operations of 810 may be performed according to the methods described herein or by apparatuses as described herein.

At 815, the circuit may perform, using a third portion of the circuit, a second set of the second operations to generate a second potential set of one or more output signals based on a second potential intermediate signal of the set. The operations of 815 may be performed according to the methods described herein or by apparatuses as described herein.

At 820, the circuit may select, based on the intermediate signal generated by the first portion of the circuit, between at least the first potential set of one or more output signals generated by the second portion and the second potential set of one or more output signals generated by the third portion. The operations of 820 may be performed according to the methods described herein or by apparatuses as described herein.

In some examples, an apparatus as described herein may perform a method or methods, such as the method 800. The apparatus may include features, means, or instructions (e.g., a non-transitory computer-readable medium storing instructions executable by a processor) for performing, using a first portion of a circuit, a set of first operations to generate an intermediate signal based on one or more input signals for the circuit, where the intermediate signal is one of a set of potential intermediate signals for the set of the first operations, performing, using a second portion of the circuit, a first set of second operations to generate a first potential set of one or more output signals based on a first potential intermediate signal of the set, performing, using a third portion of the circuit, a second set of the second operations to generate a second potential set of one or more output signals based on a second potential intermediate signal of the set, and selecting, based on the intermediate signal generated by the first portion of the circuit, between at least the first potential set of one or more output signals generated by the second portion and the second potential set of one or more output signals generated by the third portion.

In some examples of the method 800 and the apparatus described herein, at least one of the first set of the second operations may be performed concurrent with at least one of the second set of the second operations.

In some examples of the method 800 and the apparatus described herein, at least one of the set of the first operations may be performed concurrent with at least one of the first set of the second operations and at least one of the second set of the second operations.

In some examples of the method 800 and the apparatus described herein, the second portion of the circuit includes a set of one or more components, and the third portion of the circuit includes a duplicate set of the one or more components.

In some examples of the method 800 and the apparatus described herein, the first set of the second operations may be performed based on one or more additional input signals for the circuit, and the second set of the second operations may be performed based on the one or more additional input signals for the circuit.

In some examples of the method 800 and the apparatus described herein, the circuit may include an adder. Operations, features, means, or instructions for performing the set of the first operations may include operations, features, means, or instructions for performing a set of first calculations based on a first subset of a first set of bits and a first subset of a second set of bits, where the intermediate signal generated by the first portion of the circuit indicates a carry value for the set of first calculations. Operations, features, means, or instructions for performing the first set of the second operations may include operations, features, means, or instructions for performing a first set of second calculations based on a second subset of the first set of bits, a second subset of the second set of bits, and a first potential carry value for the set of first calculations. Operations, features, means, or instructions for performing the second set of the second operations may include operations, features, means, or instructions for performing a second set of second calculations based on the second subset of the first set of bits, the second subset of the second set of bits, and a second potential carry value for the set of first calculations. A set of one or more output signals of the circuit may indicate a first set of sum bits and a second set of sum bits, the first set of sum bits based on the set of first calculations, the second set of sum bits based on the selection, and the selection corresponding to the first set of second calculations or the second set of second calculations. A sum of the first set of bits and the second set of bits may include the first set of sum bits and the second set of sum bits.

In some examples of the method 800 and the apparatus described herein, the circuit may include a comparator. Operations, features, means, or instructions for performing the set of the first operations may include operations, features, means, or instructions for performing a set of first comparisons based on a first subset of a first set of bits and a first subset of a second set of bits, where the intermediate signal generated by the first portion of the circuit indicates a carry value for the set of first comparisons. Operations, features, means, or instructions for performing the first set of the second operations may include operations, features, means, or instructions for performing a first set of second comparisons based on a second subset of the first set of bits, a second subset of the second set of bits, and a first potential carry value for the set of first comparisons. Operations, features, means, or instructions for performing the second set of the second operations may include operations, features, means, or instructions for performing a second set of second comparisons based on the second subset of the first set of bits, the second subset of the second set of bits, and a second potential carry value for the set of first comparisons. A set of one or more output signals of the circuit may indicate a compare result based on the selection, the selection corresponding to the first set of second comparisons or the second set of second comparisons.

In some examples of the method 800 and the apparatus described herein, the first potential intermediate signal includes a first voltage, and the second potential intermediate signal includes a second voltage.

In some examples of the method 800 and the apparatus described herein, the first potential intermediate signal indicates a first logic value, and the second potential intermediate signal indicates a second logic value.

Some examples of the method 800 and the apparatus described herein may further include operations, features, means, or instructions for operating the memory device based on a set of one or more output signals of the circuit, where the set of one or more output signals of the circuit may be based on the selecting.

It should be noted that the methods described herein are possible implementations, and that the operations and the steps may be rearranged or otherwise modified and that other implementations are possible. Furthermore, portions from two or more of the methods may be combined.

An apparatus is described. The apparatus may include a circuit. The circuit may include a first portion configured to generate an intermediate signal based on a set of first operations associated with one or more input signals for the circuit, where the intermediate signal is one of a set of potential intermediate signals for the set of the first operations. The circuit may further include a second portion configured to generate a first potential set of one or more output signals for the circuit based on a first potential intermediate signal of the set and a first set of second operations. The circuit may further include a third portion configured to generate a second potential set of one or more output signals for the circuit based on a second potential intermediate signal of the set and a second set of the second operations. The circuit may further include a selection component configured to select, based on the intermediate signal generated by the first portion of the circuit, between at least the first potential set of one or more output signals generated by the second portion and the second potential set of one or more output signals generated by the third portion, where the circuit is configured to output a set of one or more output signals based on the selection.

In some examples, the second portion of the circuit may be configured to perform at least one of the first set of the second operations concurrent with the third portion of the circuit performing at least one of the second set of the second operations.

In some examples, the first portion of the circuit may be configured to perform at least one of the set of the first operations concurrent with the second portion of the circuit performing at least one of the first set of the second operations and with the third portion of the circuit performing at least one of the second set of the second operations.

In some examples, the second portion of the circuit includes a set of one or more components, and the third portion of the circuit includes a duplicate set of the one or more components.

In some examples, the second portion of the circuit may be further configured to perform the first set of the second operations based on one or more additional input signals for the circuit, and the third portion of the circuit may be further configured to perform the second set of the second operations based on the one or more additional input signals for the circuit.

In some examples, the first portion of the circuit may include a first sub-portion configured to generate an initial signal based on a first subset of the first operations, where the first subset of the first operations may be based on the one or more input signals for the circuit, and where the initial signal may be one of a set of potential initial signals for the first subset of the first operations. The first portion of the circuit may further include a second sub-portion configured to generate a first potential intermediate signal of the set based on a first potential initial signal of the set and a second subset of the first operations. The first portion of the circuit may further include a third sub-portion configured to generate a second potential intermediate signal of the set based on a second potential initial signal of the set and the second subset of the first operations. The first portion of the circuit may further include a second selection component configured to select the intermediate signal for the first portion of the circuit based on the initial signal generated by the first sub-portion, the selecting between at least the first potential intermediate signal generated by the second sub-portion and the second potential intermediate signal generated by the third sub-portion.

In some examples, the first portion of the circuit may include a first set of adders configured to add a first subset of a first set of bits and a first subset of a second set of bits. A second subset of the first set of bits may be more significant than the first subset of the first set of bits, and a second subset of the second set of bits may be more significant than the first subset of the second set of bits. The intermediate signal generated by the first portion of the circuit may include a carry signal generated by an adder included in the first set of adders and configured to add a most significant bit (MSB) of the first subset of the first set of bits and an MSB of the first subset of the second set of bits. The second portion of the circuit may include a second set of adders configured to add the second subset of the first set of bits and the second subset of the second set of bits based on a first potential state of the carry signal.

The third portion of the circuit may include a third set of adders configured to add the second subset of the first set of bits and the second subset of the second set of bits based on a second potential state of the carry signal. The selection component may include a set of one or more multiplexers configured to select between output signals generated by the second set of adders and output signals generated by the third set of adders.

In some examples, the first portion of the circuit may include a first set of comparators configured to compare a first subset of a first set of bits with a first subset of a second set of bits. A second subset of the first set of bits may be more significant than the first subset of the first set of bits, and a second subset of the second set of bits may be more significant than the first subset of the second set of bits. The intermediate signal generated by the first portion of the circuit may include a carry signal generated by a comparator included in the first set of comparators and configured to compare a most significant bit (MSB) of the first subset of the first set of bits with an MSB of the first subset of the second set of bits. The second portion of the circuit may include a second set of comparators configured to compare the second subset of the first set of bits with the second subset of the second set of bits based on a first potential state of the carry signal. The third portion of the circuit may include a third set of comparators configured to compare the second subset of the first set of bits with the second subset of the second set of bits based on a second potential state of the carry signal. The selection component may include a multiplexer configured to select between an output signal generated by the second set of comparators and an output signal generated by the third set of comparators.

In some examples, the selection component includes one or more multiplexers.

In some examples, the first potential intermediate signal includes a first voltage, and the second potential intermediate signal includes a second voltage.

In some examples, the first potential intermediate signal indicates a first logic value, and the second potential intermediate signal indicates a second logic value.

An apparatus is described. The apparatus may include a circuit. The circuit may include a first set of adders configured to add a first subset of a first set of bits and a first subset of a second set of bits, where an adder of the first set of adders is configured to add a most significant bit (MSB) of the first subset of the first set of bits and an MSB of the first subset of the second set of bits, and where the adder of the first set of adders is configured to generate a carry signal having one of a set of potential states of the carry signal. The circuit may further include a second set of adders configured to add a second subset of the first set of bits and a second subset of the second set of bits based on a first potential state of the carry signal. The circuit may further include a third set of adders configured to add the second subset of the first set of bits and the second subset of the second set of bits based on a second potential state of the carry signal. The circuit may further include a selection component configured to select, based on the state of the carry signal generated by the adder of the first set of adders, between output signals generated by the second set of adders and output signals generated by the third set of adders, where the circuit is configured to output a set of one or more output signals based on the selection.

In some examples, the second subset of the first set of bits may be more significant than the first subset of the first set of bits, and the second subset of the second set of bits may be more significant than the first subset of the second set of bits.

An apparatus is described. The apparatus may include a circuit. The circuit may include a first set of comparators configured to compare a first subset of a first set of bits with a first subset of a second set of bits, where a comparator of the first set of comparators is configured to compare a most significant bit (MSB) of the first subset of the first set of bits with an MSB of the first subset of the second set of bits, and where the comparator of the first set of comparators is configured to generate a carry signal having one of a set of potential states of the carry signal. The circuit may further include a second set of comparators configured to compare a second subset of the first set of bits with a second subset of the second set of bits based on a first potential state of the carry signal. The circuit may further include a third set of comparators configured to compare the second subset of the first set of bits with the second subset of the second set of bits based on a second potential state of the carry signal. The circuit my further include a selection component configured to select, based on the state of the carry signal generated by the comparator of the first set of comparators, between one or more output signals generated by the second set of comparators and one or more output signals generated by the third set of comparators, where the circuit is configured to output a set of one or more output signals based on the selection.

In some examples, the second subset of the first set of bits may be more significant than the first subset of the first set of bits, and the second subset of the second set of bits may be more significant than the first subset of the second set of bits.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals can be communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components from one another, the controller affects a change that prevents signals from flowing between the components using a conductive path that previously permitted signals to flow.

As used herein, the term "substantially" means that the modified characteristic (e.g., a verb or adjective modified by the term substantially) need not be absolute but is close enough to achieve the advantages of the characteristic.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other cases, the substrate may be a silicon-on-insulator (SOI) substrate, such as silicon-on-glass (SOG) or silicon-on-sapphire (SOS), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine.

A processor may also be implemented as a combination of computing devices (e.g., a combination of a DSP and a microprocessor, multiple microprocessors, one or more microprocessors in conjunction with a DSP core, or any other such configuration).

Functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part in."

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
a first set of comparators configured to generate a carry signal based at least in part on a comparison of a first subset of a first set of bits with a first subset of a second set of bits, the carry signal having one of a plurality of potential states;
a second set of comparators configured to generate a first potential set of one or more output signals based at least in part on a comparison of a second subset of the first set of bits with a second subset of the second set of bits and on a first potential state of the carry signal;

a third set of comparators configured to generate a second potential set of one or more output signals based at least in part on a comparison of the second subset of the first set of bits with the second subset of the second set of bits and on a second potential state of the carry signal; and a selection component configured to output, based at least in part on a state of the carry signal generated by the first set of comparators, a set of one or more output signals that are based at least in part on the first potential set of one or more output signals or the second potential set of one or more output signals.

2. The apparatus of claim 1, wherein the second set of comparators and the third set of comparators are configured to generate the first potential set of one or more output signals and the second potential set of one or more output signals, respectively, in parallel.

3. The apparatus of claim 1, wherein the first set of comparators are configured to generate the carry signal in parallel with the generation of the first potential set of one or more output signals and the second potential set of one or more output signals.

4. The apparatus of claim 1, wherein the third set of comparators comprises a duplicate set of the second set of comparators.

5. The apparatus of claim 1, wherein:
the second subset of the first set of bits is more significant than the first subset of the first set of bits; and
the second subset of the second set of bits is more significant than the first subset of the second set of bits.

6. The apparatus of claim 1, wherein a comparator of the first set of comparators is configured to compare a most significant bit (MSB) of the first subset of the first set of bits with an MSB of the first subset of the second set of bits and configured to generate the carry signal based at least in part on the comparison.

7. The apparatus of claim 1, wherein:
the first potential state of the carry signal corresponds to a first logic value or a first voltage; and
the second potential state of the carry signal corresponds to a second logic value or a second voltage.

8. The apparatus of claim 1, wherein the selection component is configured to select the first potential set of one or more output signals or the second potential set of one or more output signals based at least in part on the state of the carry signal, and wherein the set of one or more output signals are based at least in part on the first potential set of one or more output signals or the second potential set of one or more output signals in accordance with the selection.

9. A method, comprising:
generating, using a first set of comparators, a carry signal based at least in part on a comparison of a first subset of a first set of bits with a first subset of a second set of bits, the carry signal having one of a plurality of potential states;
generating, using a second set of comparators, a first potential set of one or more output signals based at least in part on a comparison of a second subset of the first set of bits with a second subset of the second set of bits and on a first potential state of the carry signal;
generating, using a third set of comparators, a second potential set of one or more output signals based at least in part on a comparison of the second subset of the first set of bits with the second subset of the second set of bits and on a second potential state of the carry signal; and selecting between at least the first potential set of one or more output signals and the second potential set of one or more output signals using a selection component, based at least in part on the generated carry signal.

10. The method of claim 9, wherein generating the first potential set of one or more output signals occurs in parallel with generating the second potential set of one or more output signals.

11. The method of claim 9, wherein generating the carry signal occurs in parallel with generating the first potential set of one or more output signals and generating the second potential set of one or more output signals.

12. The method of claim 9, wherein the third set of comparators is a duplicate set of the second set of comparators.

13. The method of claim 9, wherein generating the carry signal comprises:
comparing, using a comparator of the first set of comparators, a most significant bit (MSB) of the first subset of the first set of bits with an MSB of the first subset of the second set of bits, the carry signal generated based at least in part on the comparison.

14. The method of claim 9, wherein:
the second subset of the first set of bits is more significant than the first subset of the first set of bits; and
the second subset of the second set of bits is more significant than the first subset of the second set of bits.

15. An apparatus, comprising:
a set of memory cells; and
a controller coupled with the set of memory cells, wherein the controller is configured to cause the apparatus to:
generate, using a first set of comparators, a carry signal based at least in part on a comparison of a first subset of a first set of bits with a first subset of a second set of bits, the carry signal having one or a plurality of potential states;
generate, using a second set of comparators, a first potential set of one or more output signals based at least in part on a comparison of a second subset of the first set of bits with a second subset of the second set of bits and on a first potential state of the carry signal;
generate, using a third set of comparators, a second potential set of one or more output signals based at least in part on a comparison of the second subset of the first set of bits with the second subset of the second set of bits and a second potential state of the carry signal; and
select between at least the first potential set of one or more output signals and the second potential set of one or more output signals using a selection component, based at least in part on the generated carry signal.

16. The apparatus of claim 15, wherein the first potential set of one or more output signals are generated in parallel with the generation of the second potential set of one or more output signals.

17. The apparatus of claim 15, wherein the carry signal is generated in parallel with the generation of the first potential set of one or more output signals and the generation of the second potential set of one or more output signals.

18. The apparatus of claim 15, wherein the third set of comparators is a duplicate set of the second set of comparators.

19. The apparatus of claim 15, wherein, to generate the carry signal, the controller is configured to cause the apparatus to:

compare, using a comparator of the first set of comparators, a most significant bit (MSB) of the first subset of the first set of bits with an MSB of the first subset of the second set of bits, the carry signal generated based at least in part on the comparison.

20. The apparatus of claim 15, wherein:
the second subset of the first set of bits is more significant than the first subset of the first set of bits; and
the second subset of the second set of bits is more significant than the first subset of the second set of bits.

* * * * *